United States Patent [19]

Visos et al.

[11] 3,800,823
[45] Apr. 2, 1974

[54] ADJUSTABLE STEPPED-OPENING DIAPHRAGM GAS VALVE

[75] Inventors: Charles D. Visos, Manchester; John J. Love; Carl A. Smith, both of St. Louis, all of Mo.

[73] Assignee: Emerson Electric Co., St. Louis, Mo.

[22] Filed: May 4, 1973

[21] Appl. No.: 357,120

[52] U.S. Cl............................. 137/489.5, 137/495
[51] Int. Cl............................................ F16k 31/12
[58] Field of Search . 137/494, 495, 505.14, 505.15, 137/489, 505.37, 505.4, 489.5; 251/61, 48; 236/7, 80, 92 A

[56] References Cited
UNITED STATES PATENTS

| | | | |
|---|---|---|---|
| 3,307,785 | 3/1967 | Currie | 137/489 X |
| 3,351,085 | 11/1967 | Allingham | 137/495 |
| 3,354,901 | 11/1967 | Dietiker et al. | 137/495 |
| 3,451,421 | 6/1969 | Vicenzi et al. | 137/495 |
| 3,721,263 | 3/1973 | Visos et al. | 137/495 |
| 3,749,120 | 7/1973 | Love et al. | 137/495 X |

*Primary Examiner*—Alan Cohan
*Assistant Examiner*—Robert J. Miller
*Attorney, Agent, or Firm*—Charles E. Markham

[57] ABSTRACT

A fluid pressure-operated gas valve device has an adjustably biased pressure regulator which controls the operating pressure and is initially biased so as to effect a first predetermined valve opening step when operating pressure is applied and a delayed action pressure-operated actuator which acts, following a brief delay, to increase the regulator bias and effect a second predetermined valve opening step. Means are included to adjustably preset two combinations of the initial and increased regulator bias, with means to conveniently shift the biasing from one preset combination to the other to adapt to one or the other of two fuel gases.

10 Claims, 9 Drawing Figures

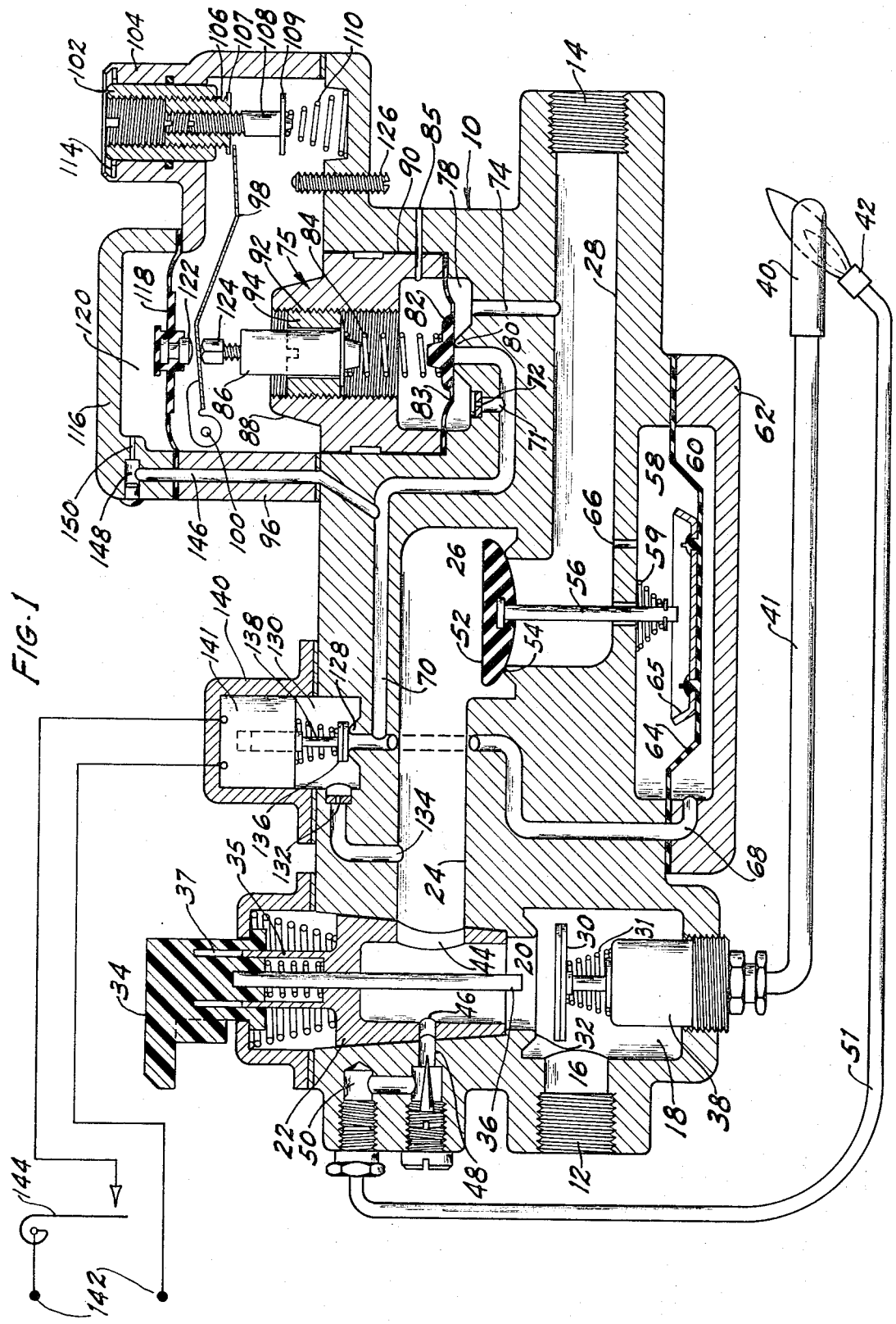

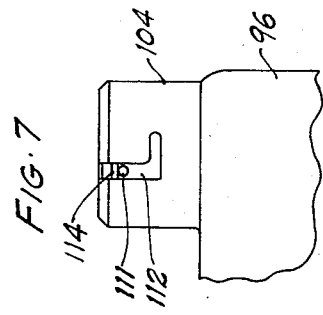
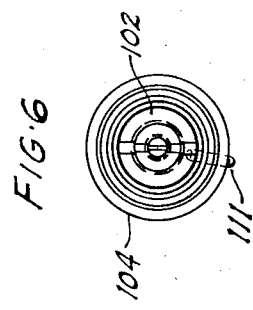
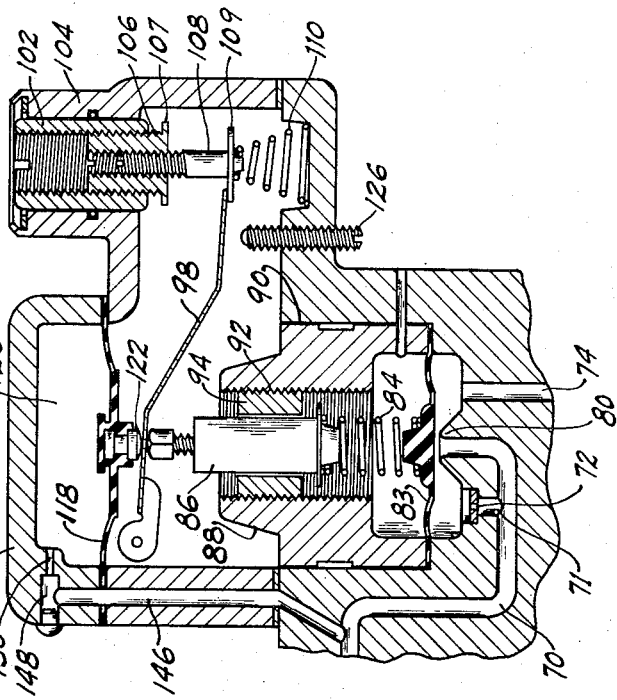
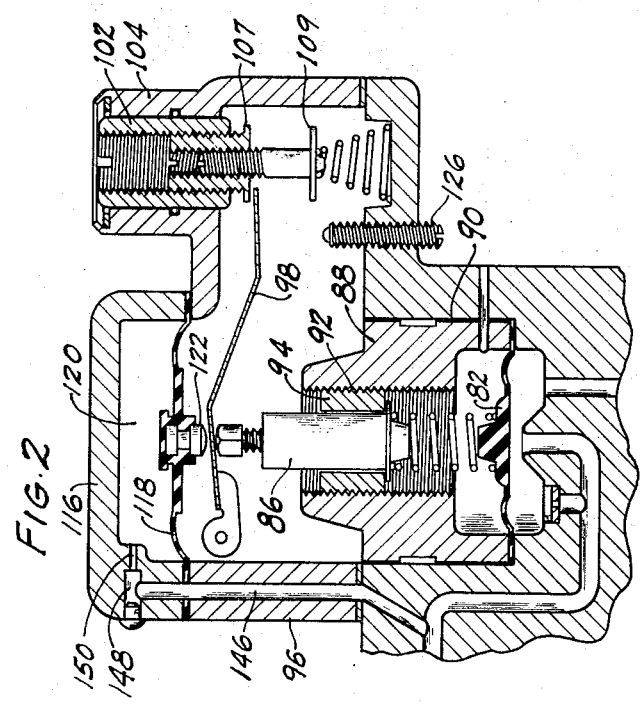

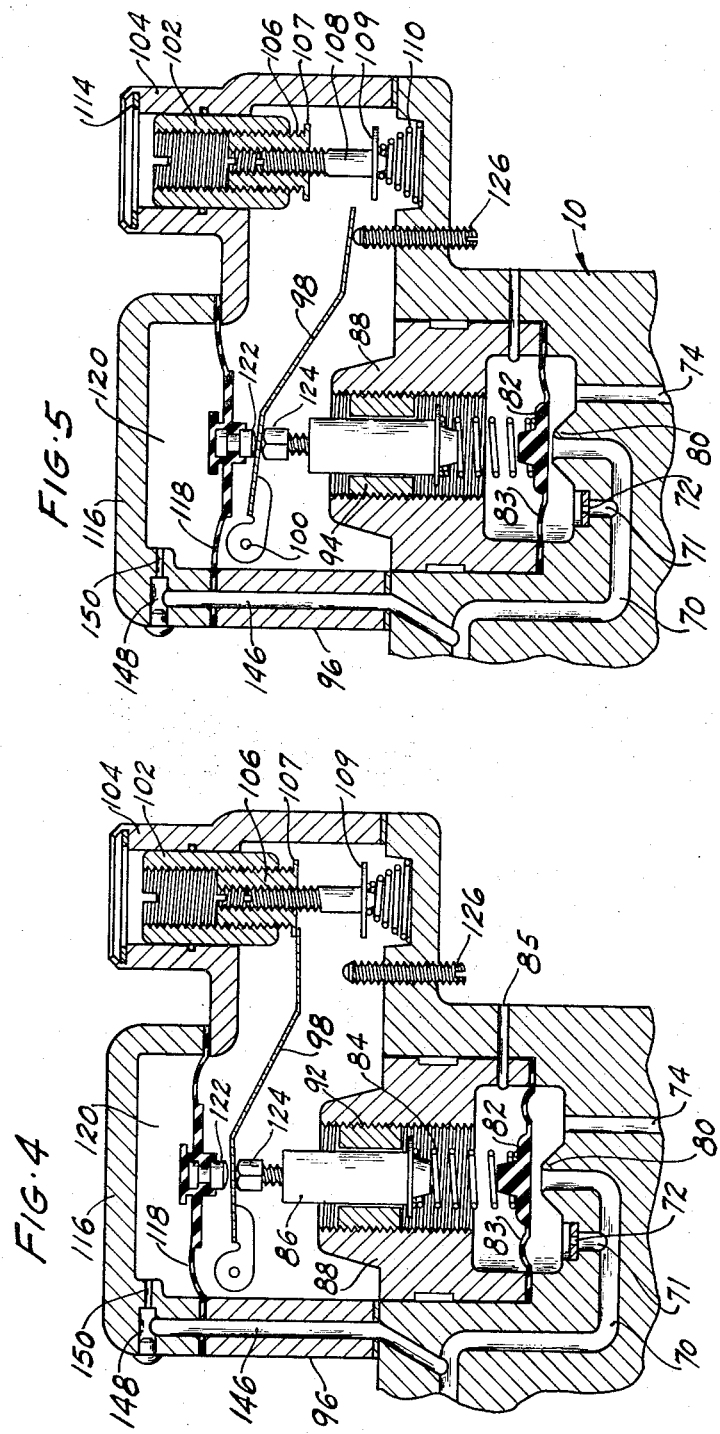
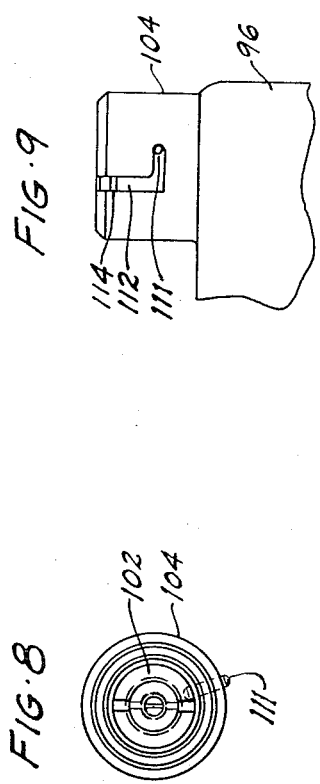

ADJUSTABLE STEPPED-OPENING DIAPHRAGM GAS VALVE

This invention relates generally to stepped opening pressure-operated gas valves wherein application of an initial operating pressure value effects a first valve opening step and a subsequent increase in this pressure after a short delay effects a second valve opening step. More particularly, the invention relates to adjustment means whereby the initial and subsequently increased operating pressure values of a stepped opening pressure-operated gas valve may be varied independently and jointly.

It is desirable to provide adjustment means in a stepped opening pressure-operated gas valve so that the rates of fuel flow to the burner permitted by the first and second opening steps of the valve may be independently varied, thereby to render the device universally adaptable for use with a variety of burners and combustion chamber designs. It is also desirable to provide means whereby one preset combination of adjustments providing the desired initial and total flow rates to a particular burner and combustion chamber when burning one kind of fuel gas may be conveniently shifted to another preset combination of adjustments providing the desired flow rates when burning another kind of fuel gas.

Currently, the two most widely consumed fuel gases in the United States are the so-called natural gas and bottled or liquid petroleum gas (LPG). Because the heat value of LP gas is two to three times greater than that of natural gas, a smaller metering orifice at the burner is required when burning LP gas than when burning natural gas if the same b.t.u. input to the burner is to be maintained. Also, because LP gas is two to three times heavier than natural gas, it is essential when burning LP gas to maintain a considerably higher flow velocity through the burner orifice than when burning natural gas so as to attain the required injection of combustion air. To attain this higher velocity, a higher supply pressure and a higher pressure at the outlet of the controlling gas valve are required.

It is an object, therefore, of this invention to provide means in a stepped opening, fluid pressure-operated gas valve for independently adjusting the operating pressure values which effect the first and second valve opening steps, for adjustably presetting two combinations of these operating pressure values, and for conveniently shifting from one such preset combination of pressure values to the other.

Further objects and advantages will appear from the following description and accompanying drawings.

In the drawings:

FIG. 1 is a cross-sectional view of a manifold gas valve device having an adjustable, stepped opening, pressure operated main valve constructed in accordance with the present invention;

FIGS. 2 and 3 are fragmentary cross-sectional views showing first and second biased positions of the pressure regulator when operating with one preset combination of biasing adjustments;

FIGS. 4 and 5 are similar fragmentary cross-sectional views showing first and second biased positions of the pressure regulator when operating with another preset combination of biasing adjustments;

FIGS. 6 and 7 are fragmentary top plan and elevational views, respectively, of the bias shifting member and latching means therefor, with the shifting member shown in an upper released position;

FIGS. 8 and 9 are detailed fragmentary top plan and elevational views, respectively, showing the bias shifting member in a downward latched position.

Referring to the drawings in more detail, the device comprises a body member generally indicated at 10. The body 10 may consist of several sections joined together in any suitable manner so as to permit casting and boring of cavities and passages therein. In the drawing, the body is illustrated as an integrally formed structure with all passages and cavities lying in the plane of the cross-section, thereby to simplify the description of the arrangement and cooperation of various parts and elements.

The body 10 has an inlet 12 adapted to receive a gas supply conduit and an outlet 14 adapted to receive a conduit leading to a main burner (not shown). The inlet 12 and outlet 14 are connected by a passageway 16, a chamber 18, a passageway 20, a hollow rotary plug valve 22 having a main port 44, a passageway 24, a chamber 26, and a passageway 28. A safety cutoff valve 30 cooperates with a seat 32 to control the flow from inlet 12 to outlet 14. The valve 30 is manually opened by depressing a knob 34 having a pin 36 and is biased to a closed position by a spring 31. Valve 30 is held open by an electromagnet 38 energized through leads 41 by a thermocouple junction 40 when heated by an adjacent pilot burner 42. This arrangement prevents the flow of fuel to the main and pilot burners when the pilot burner is not burning.

The main port 44 in the wall of hollow rotary plug valve 22 registers with passageway 24 when the plug valve is rotated to an "on" position. The knob 34 is axially slidable relative to plug valve 22 on circularly spaced, axially extending tangs 35 which enter circularly spaced sockets 37 in knob 34. Knob 34 is thereby also keyed to plug valve 22 for rotation therewith. The plug valve 22 is further provided with a circumferentially extending pilot burner port 46 in the wall thereof which registers with a passageway 48 when the plug valve 22 is in an on position. The pilot outlet 50 is connected to pilot burner 42 by a conduit 51.

A main valve 52 cooperating with an annular seat 54 formed in chamber 26 around the exit of passageway 28 also controls the flow from inlet 12 to outlet 14. Valve 52 has a stem 56 extending downward into an upper diaphragm chamber 58 which is formed as a recess in body 10, and a spring 59 biases valve 52 downward in a closed position on its seat 54. A lower diaphragm chamber 60 is formed by a cup-shaped member 62 attached to the body 10, and a flexible diaphragm 64 clamped at its periphery between body 10 and member 62 defines the upper and lower main diaphragm chambers 58 and 60, respectively. The diaphragm 64 includes a relatively rigid disc member 65 centrally positioned and attached thereto. The disc member 65 provides weight to bias the diaphragm downward in the position shown.

The upper diaphragm chamber 58 is adequately vented to outlet passage 28 through a vent 66 so that the upper side of diaphragm 64 is constantly exposed to pressure existing in outlet passage 28. The lower diaphragm chamber 60 is also in constant communication with outlet passage 28 through a passage 68, a passage 70, a passage 71, a restricting orifice 72, the diaphragm chamber 78 of a pressure regulator generally indicated at 75, and a passage 74 leading to passage 28. A valve seat 80 controlled by a pressure regulating valve 82 provides additional venting or bleed off to outlet 14 under conditions to be described. The regulator valve 82 is formed as an integral central part of a pressure regulator diaphragm 83 which is exposed to atmospheric pressure on its upper side through a vent 85. A spring 84 biased between the lower end of a sliding plunger member 86 and the regulator valve 82 biases valve 82 on its seat 80.

The pressure regulator 75 further comprises a generally cylindrical member 88 fitted into a cavity 90 in main body member 10, the periphery of the regulator diaphragm 83 being clamped between member 88 and the body member 10. The member 88 has a screw-threaded axial bore 92 which receives an externally screw-threaded bushing 94, and the bushing 94, in turn, slidably receives the plunger member 86. The lower end of plunger 86 has a flange which limits its upward movement, and the bushing 94 is provided with a screwdriver slot whereby the bushing may be adjusted upward or downward to vary the closing bias applied to regulator valve 82 by spring 84.

A casing 96 mounted on main body 10 pivotally supports one end of a lever 98 on a pivot 100 mounted in the side wall thereof. The free end of lever 98 lies adjacent the lower end of an internally screw-threaded bushing 102 slidably mounted in an upwardly extending hollow boss portion 104 of casing 96. The slidably mounted bushing 102 threadedly receives an internally and externally threaded bushing 106. Bushing 106 has a flange 107 at the lower end thereof which under certain conditions engages the free end of lever 98. Bushing 106 further threadedly receives a screw-threaded pin 108 having a flange 109 at the lower end thereof which is also engaged under certain conditions by the free end of lever 98. A spring 110 biased between the lower end of pin 108 and the body member 10 biases the bushing 102 upward.

Referring to FIG. 7, a pin 111 fixed in bushing 102 moves in an L-shaped slot 112 to latch bushing 102 in a depressed position. A washer 114 retained in the upper end of boss 104 is engaged by pin 111 to limit the upward movement of slidable bushing 102. The upper end of bushing 102 is provided with a screwdriver slot to facilitate the rotation thereof into and out of a depressed latched position.

From the foregoing, it will be seen that the flange 107 on bushing 106 and the flange 109 on pin 108 are moved simultaneously between lower and upper positions as the slidable bushing 102 is moved from an upper limit position, shown in FIGS. 1, 2, and 3, to a lower latch position, shown in FIGS. 4 and 5. It will also be apparent that the positions of flanges 107 and 109 may be independently adjusted with relation to bushing 102. The upper ends of bushing 106 and pin 108 are provided with screwdriver slots to facilitate adjustably positioning these flanges.

The casing 96 has a circular opening in the top wall thereof enclosed by a cup-shaped cover member 116. A flexible diaphragm 118 clamped at its periphery between the rim of cover member 116 and the casing 96 defines an upper expansible chamber 120. The diaphragm 118 is fitted with a central rigid contact member 122 which under certain conditions engages the lever 98 at a point intermediate its pivoted and free ends. When the expansible chamber 120 is in a contracted condition, the member 122 is spaced from the lever 98. A screw-threaded contact member 124 threadedly engaged in the plunger 86 and underlying lever 98 provides means for adjusting this spacing. A screw 126 threadedly engaged in main body member 10 extends upward into casing 96 and is adapted to be engaged under certain conditions by the free end of lever 98.

Communication between lower main diaphragm chamber 60 and inlet 12 is provided through passage 68, a valve seat 128 at the upper end of passage 68, a valve chamber 130, a restricting orifice 132 and a passage 134 to passage 24 and, thence, through hollow plug valve 22, passage 20, chamber 18, and passage 16 to inlet 12. A solenoid operated valve 136 biased closed by a spring 138 cooperates with valve seat 128 to control this communication. The valve 136 has a stem 138 connected to the plunger of a solenoid 140. The solenoid has a winding 141 connected across power source terminals 142 through a space thermostat 144. The restricting orifice 132 is larger in diameter than restricting orifice 72 in bleed-off passage 71, so that when solenoid operated valve 136 is opened, the pressure will increase in diaphragm chamber 60.

The upper expansible chamber 120 communicates with the lower main diaphragm chamber 60 through passages 68 and 70, a passage 146, a passage 148, and a restricting orifice 150, so that a pressure change in chamber 60 is slowly communicated to expansible chamber 120.

OPERATION

The manifold valve device is shown in FIG. 1 in an "on" position; that is to say, the hollow plug valve 22 is in an on position in which gas may flow through its main port 44 to passage 24 and through pilot port 46 to pilot burner 42. Also, the pilot burner is burning and cutoff valve 30 is being held open by electromagnet 38. The space thermostat 144 is, however, in open position so that the solenoid operated control valve 136 is biased closed, whereby communication between inlet 12 and the lower diaphragm chamber 60 is cut off. Since upper main diaphragm chamber 58 is constantly vented to outlet passage 28 through vent 66 and lower diaphragm chamber 60 is also constantly vented to the same pressure zone through orifice 72, the diaphragm 64 is in its lower position and main valve 52 is biased closed by spring 59.

Under these conditions, when space thermostat 144 closes due to a drop in temperature, solenoid winding 141 is energized and control valve 136 will open, thereby placing lower diaphragm chamber 60 in communication with inlet 12. Since the venting orifice 72 in passage 71 is smaller than the inlet orifice 132 in passage 134, the pressure in lower main diaphragm chamber 60 will now increase, causing diaphragm 64 to flex upward and move main valve 52 openward a predetermined amount against biasing spring 59. The extent of this initial partial opening movement of main valve 52 will be determined by the rate of pressure bleed off permitted by the pressure regulator valve 82 which, in turn, will be determined by the force of the closing bias of regulator spring 84.

Following the opening of valve 136, the operating pressure in the main diaphragm chamber 60 is slowly applied to the upper expansible chamber 120 through passages 68, 70, 146, 148, and the restricting orifice 150. As the pressure in expansible chamber 120 slowly increases, the diaphragm 118 flexes downward until its central contact member 122 engages the lever 98. After the contact member 122 engages lever 98, the further downward flexing of diaphragm 118 moves the free end of lever 98 and plunger 86 downward, thereby increasing the force of the closing bias on regulator valve 82 and reducing the rate of pressure bleed off.

This reduction in pressure bleed-off rate results in an increased operating pressure in diaphragm chamber 60, thereby causing the valve 52 to be moved further openward in a second opening step. The amount of main valve opening movement occurring in the second step, which is also the total valve opening movement at the instant inlet pressure, will be determined by the rate of pressure bleed off permitted by the pressure regulator, which, in turn, will be determined by the now-increased biasing force of regulator spring 84.

Two combinations of initial and increased regulator spring biasing forces may be preset, as indicated in FIGS. 2 and 3 and FIGS. 4 and 5, respectively.

In a first combination, the initial biasing force is adjustably preset by rotation of screw-threaded bushing 94 and the increased biasing force by rotation of screw-threaded pin 108. Referring to FIG. 2, it will be seen that rotation of screw-threaded bushing 94 adjusts the initial bias of regulator spring 84 when the expansible chamber 120 is contracted. Referring to FIG. 3, it will be seen that rotation of pin 108 varies the position of its flange 109 and variably limits the downward swing of lever 98 and, therefore, limits the increase in biasing force of spring 84 effected by expansion of chamber 120.

In a second combination, the initial biasing force is preset by rotation of screw-threaded bushing 106, and the increased force is adjustably preset by rotating the adjustment screw 126. Referring to FIG. 4, it will be seen that rotation of bushing 106 variably limits the upward travel of lever 98, and referring to FIG. 5, it will be seen that rotation of screw 126 variably limits the downward travel of the free end of lever 98. It will also be noted that both the initial and increased biasing forces are greater in the second preset combination shown in FIGS. 4 and 5.

The initial and increased biasing of the pressure regulator spring, as effected by one or the other of these two preset combinations, may be conveniently selected by positioning the slidably mounted bushing 102 in its upper released position shown in FIGS. 2, 3, 6, and 7, or in its lower latched position shown in FIGS. 4, 5, 8, and 9. When slidable bushing 102 is in its upper released position of FIGS. 2 and 3, the lever 98 does not engage the underside of flange 107. The upward movement of plunger 86 is limited, under these conditions, by engagement of the flange on the lower end thereof with adjustable bushing 94, which determines the initial bias in this case. When slidable bushing 102 is in its depressed and latched position of FIGS. 4 and 5, the downward movement of lever 98 is not limited by the flange 109 on threadedly adjustable pin 108. The downward movement of lever 98 is limited by adjusting screw 126 in this case.

From the foregoing, it will be seen that the initial and total flow of gas to a burner may be independently adjusted by means of screw 124, which adjusts the space between lever 98 and contact member 122. It will also be seen that two combinations of initial and total flow may be preadjusted or preset and that an operator can quickly and conveniently shift from one of these preset combinations to the other by the mere depression of slidable bushing 102 and the slight rotation thereof to a latched position, or from the other to the one by a slight rotation of bushing 102 to release it.

These two preset combinations of adjustments may be made when the devices are manufactured to meet the requirements of a gas burning appliance manufacturer to whom they are supplied. In the field, the gas burning appliance is, therefore, quickly and conveniently adaptable to burn either natural or liquid petroleum gas.

We claim:

1. In a stepped-opening pressure-operated valve device, a biased closed main valve, an expansible chamber operative when expanding to move said valve openward, means to supply fluid pressure to said chamber including an open or closed control valve, an adjustably biased pressure regulator controlling the pressure in said chamber and operative to effect an increase in pressure when the bias thereon is increased, a delayed action actuator operative to increase the regulator bias subsequent to opening of said control valve, first adjustable means for presetting an initial regulator bias and for presetting a limit to which said actuator increases said initial bias, second adjustable means for presetting a higher initial regulator bias and for presetting a higher limit to which said actuator increases said higher initial bias, and a member movable oppositely to alternately shift said first and second adjustable means between operative and inoperative positions.

2. The device claimed in claim 1 in which said first adjustable means comprises independently adjustable elements for presetting an initial regulator bias and for presetting the limit to which said actuator can increase the initial regulator bias.

3. The device claimed in claim 1 in which said first and second adjustable means each comprise independently adjustable elements for presetting an initial regulator bias value and for presetting the limit to which said actuator can increase the initial bias value.

4. The device claimed in claim 3 in which said first and second adjustable means each comprise two independently adjustable abutments and in which means movable with said actuator engages said adjustable abutments of one or the other of said adjustable means.

5. The device claimed in claim 4 in which one of said abutments of said first adjustable means and one of said abutments of said second adjustable means are adjustably mounted on said movable member and are jointly shifted between a first operative position in which one of said abutments is engaged by said means movable with said actuator and the other is not and a second operative position in which the other of said abutments is engaged and the one is not.

6. In a stepped-opening diaphragm valve device having a biased closed main valve, means controlling the operating pressure applied to one side of the diaphragm including a control valve and a spring biased pressure regulator operative in response to an increase in the bias thereon to effect increased opening of said valve, and a delayed action actuator operative to increase the regulator bias from an initial preset bias to a greater bias in a short period of time following the opening of said control valve; an improvement comprising means movable with and forming an operative connection between said actuator and said regulator biasing spring, two pairs of spaced abutments arranged to be selectively engaged by said operative connecting means, the first abutment of each pair establishing an initial regulator bias and the second abutment of each pair establishing a limit to which said actuator increases said bias, and means to jointly shift said first abutment of one pair and said second abutment of the other pair relative to the first abutment of the other pair and the second abutment of the first pair, whereby either of two combinations of initial and increased regulator bias values may be conveniently selected.

7. The device claimed in claim 6 in which said first abutment of one pair of abutments and said second abutment of the other pair of abutments are mounted on a member movable with respect to the other of said abutments, said movable member being movable to a first operative position in which said first abutment of said one pair is operatively engaged and said second abutment of said other pair is spaced from engagement, and said movable member being movable oppositely to a second operating position in which said second abutment of said one pair is operatively engaged and said first member is spaced from engagement.

8. The device claimed in claim 7 including spring means biasing said movable member in one of said operative positions and means releasably latching said movable member in the other of said operative positions.

9. The device claimed in claim 7 in which two of said abutments are adjustably mounted on said movable member.

10. The device claimed in claim 7 in which one abutment of each pair is adjustably mounted on said movable member and one abutment of each pair is adjustably mounted on support means fixed with relation to said connecting means and said movable member.

* * * * *